Dec. 16, 1941.  C. EISLER  2,266,417
MACHINE FOR SHAPING THE MOUTHS OF TUBULAR GLASS ARTICLES
Filed Dec. 19, 1939  3 Sheets-Sheet 1
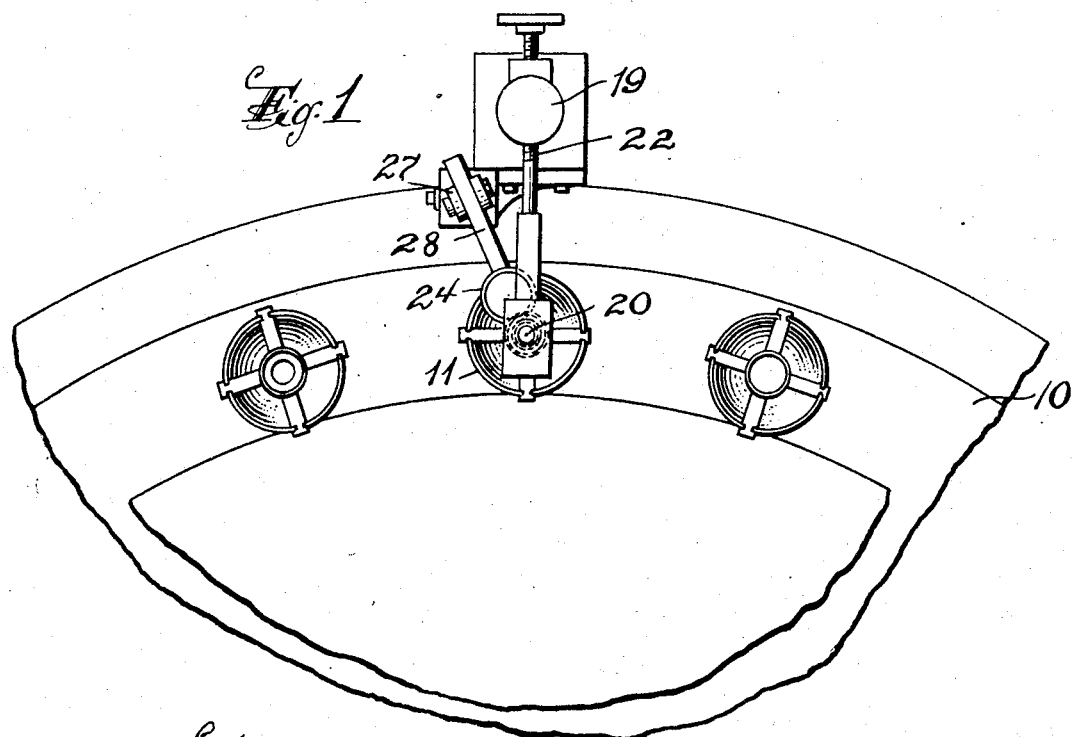
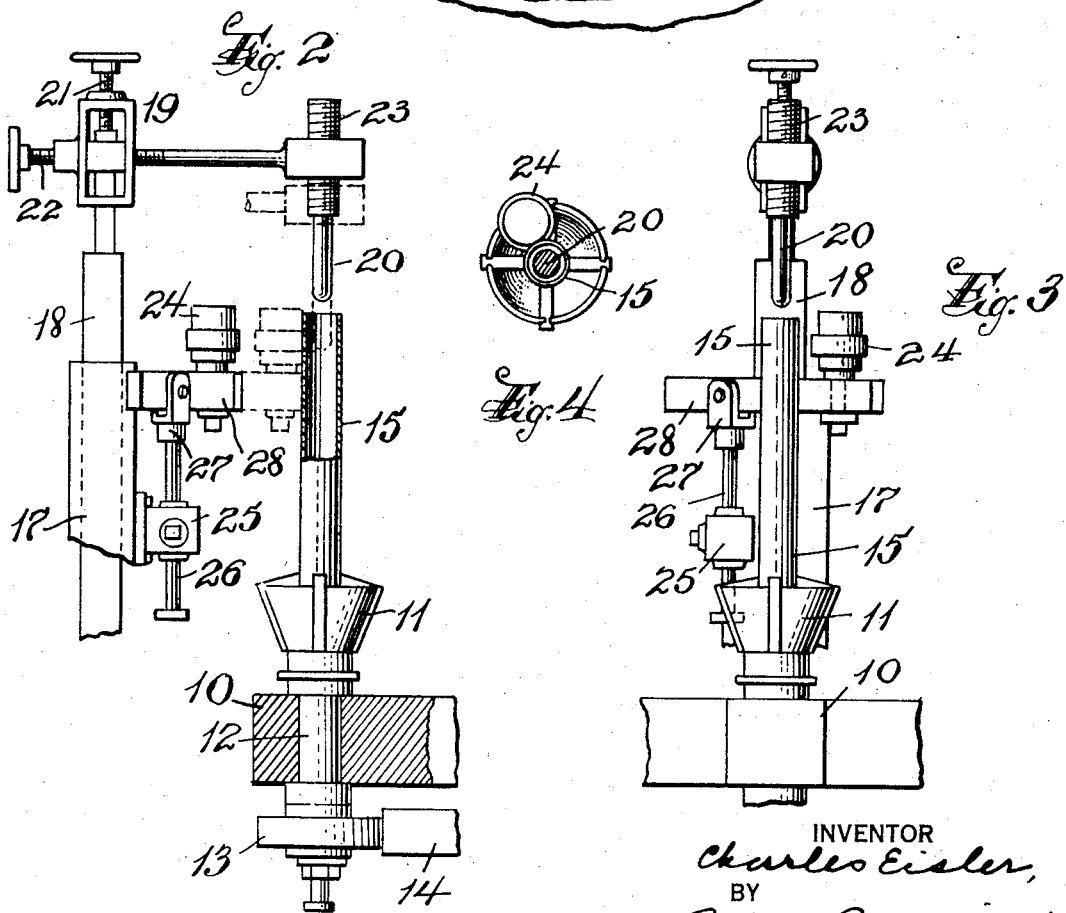
INVENTOR
Charles Eisler,
BY
Wm H Caufield
ATTORNEY Dec. 16, 1941.  C. EISLER  2,266,417
MACHINE FOR SHAPING THE MOUTHS OF TUBULAR GLASS ARTICLES
Filed Dec. 19, 1939  3 Sheets-Sheet 2
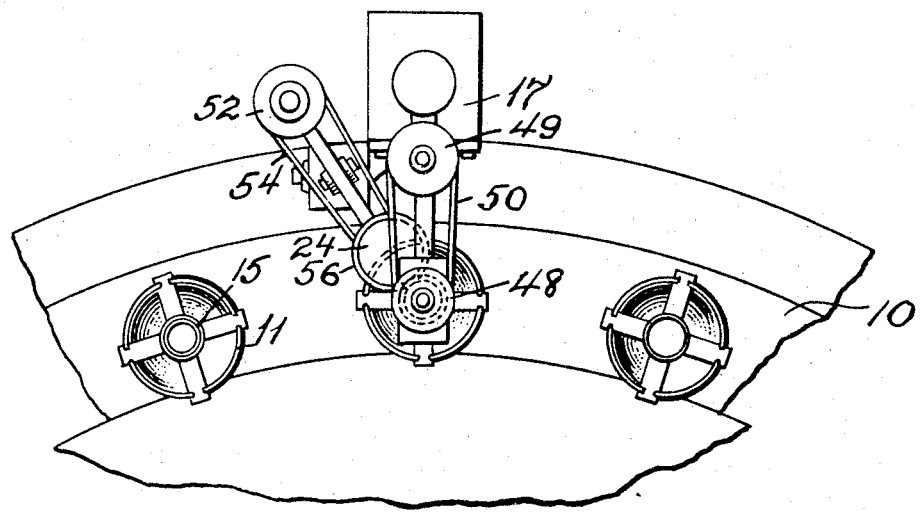
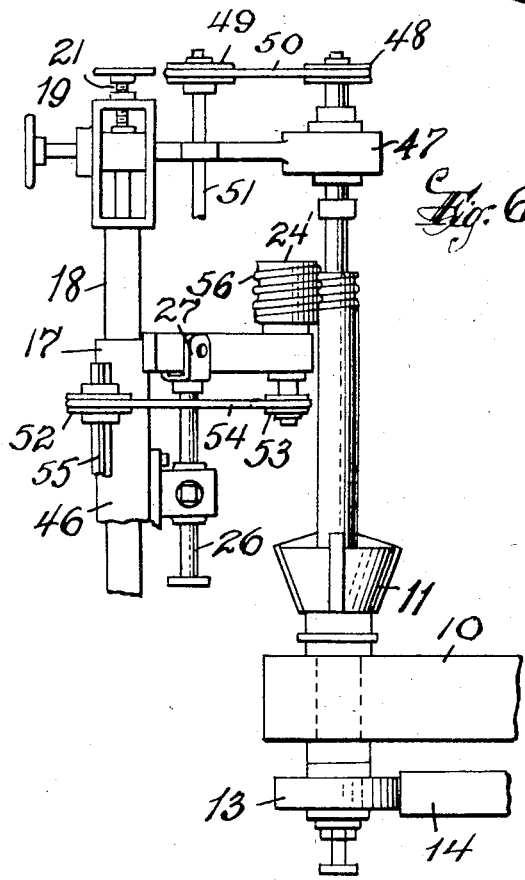
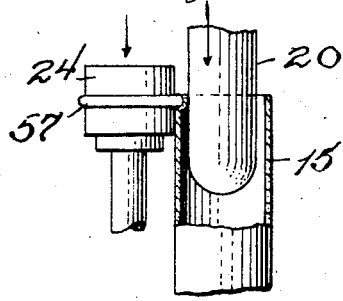
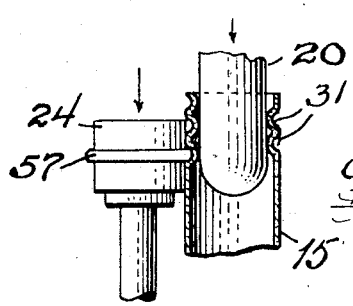
INVENTOR
Charles Eisler,
BY
Wm. H. Camfield.
ATTORNEY

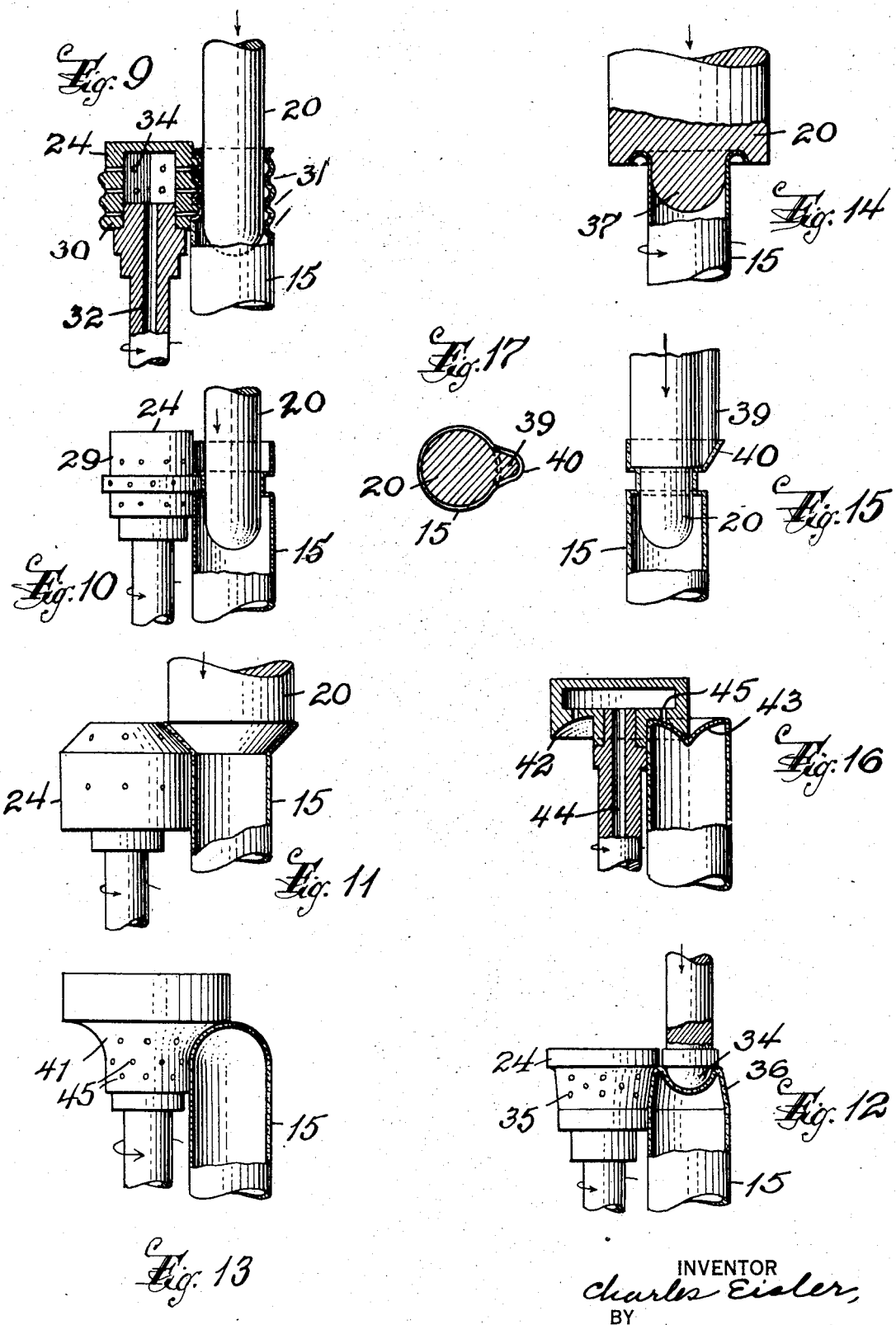

Patented Dec. 16, 1941

2,266,417

UNITED STATES PATENT OFFICE 2,266,417

MACHINE FOR SHAPING THE MOUTHS OF TUBULAR GLASS ARTICLES

Charles Eisler, South Orange, N. J.

Application December 19, 1939, Serial No. 309,924

3 Claims. (Cl. 49—22)

This invention relates to a machine for shaping the mouths of tubular glass articles and is an improvement in the type of machines that are designed for continuous operation. Such machines are in commercial use and are operated by a step-by-step mechanism to intermittently revolve a circular platform provided with clamps that support vertically held glass articles such as glass tubes, bottles and other forms. The machines are not illustrated or described in detail herein as they in themselves do not constitute any part of this invention.

The invention is directed to a fixture comprising a rotating shaping tool that can be manually or automatically placed in contact with the heated end of the supported glass tubular element and also, if need be, equipped with a shaping tool placed against the outside wall of the heated glass tube to co-operate with the inside tool or mandril in forming the end of the glass tube.

The invention is illustrated in the accompanying drawing in which Figure 1 is a top view of part of a machine to which the present invention is affixed. Figure 2 is a side view showing the edge of the machine holding and advancing the glass tube and illustrating one form of the invention in elevation. Figure 3 is a front view of the parts shown in Figure 2. Figure 4 is a detail view of the top of the glass tube and the holder and the inside and outside shaping tool shown in Figures 2 and 3. Figure 5 is a view similar to Figure 1 but showing a rotatable set of shaping tools. Figure 6 is a side view of the support and shaping tools shown in Figure 5. Figure 7 shows one form of such rotatable inside and outside tools and Figure 8 is a view showing the same tools in a more progressive position. Figure 9 is a detail view of a set of shaping tools as shown in Figure 6 but on an enlarged scale. Figures 10, 11 and 12 are modifications of inner and outer shaping tools. Figure 13 is a view of a modified form of outside shaping tool. Figures 14, 15 and 16 are views of modified forms of inside shaping tools. Figure 17 is a cross-section taken across the mouth of the tube shown in Figure 15.

The invention is applicable to machines that have a rotatable platform such as that shown at 10 which is moved by a step-by-step mechanism to rotate with an intermittent motion in order that various heating and other means are applied to tubular glass articles. The platform is provided with suitable holders 11 of any desired form to hold the glass articles, which are rotated at selected points in the circular travel of the platform or are rotated continuously on the platform. The drawing is illustrated showing holder at 11 mounted on a shaft 12 which is rotated by a disc 13 contacting with a disc 14, the latter rotating in a direction or at a speed to impart rotary motion to the holder relative to the rotatable platform 10. The holders are designed to hold the glass articles 15 which may be of various forms but for simplicity and clear understanding is illustrated as a simple glass tube in some cases with an open upper end and in others with a closed end.

At selected points where the articles or tubes of glass 15 come to a stop is placed the fixture for the shaping tools. In Figures 2 and 3 the fixture is secured to the base of the machine proper or rests on the floor. The fixture comprises a support 17 in which is the slidable rod 18 on which is mounted a holder 19 for the shaping tool 20. The holder 19 is adjustable vertically by the screw 21 and is adjustable horizontally by the screw 22 and the tool 20 itself may be adjusted on the end of the arm or screw 22 by reason of the screw threaded part 23 of the tool 20. This tool is one that descends into the tube 15 longitudinally of the tube. The fixture supports the laterally movable or outside shaping tool 24 by the bracket 25 in which is the screw 26 which supports the bearing 27 which swings on the screw 26 and supports the arm 28 on which tool 24 is mounted.

The tools are shaped as desired and the tool 20 is shown as with a rounded end and can be used to hold the end of the tube 15 and thus co-operate with the tool 24 which may be shaped as at 29 in Figure 10 to produce an annular recess in the tube 15. Another form is shown at 30 in Figure 9 which shows a series of recesses 31 formed in the tube 15. In these forms the outside tool is provided with a reservoir or duct 32 with small or minute outlets 33 for supplying oil to the tube while it is being shaped, the oil being preferably supplied under slight pressure.

The tools may be varied. For instance, the inside tool may be used to form the end of a closed tube by having its end 34 engage the tube to press it in and the tool 24 may be shaped to buttress the outside of the tube or it may be tapered as at 35 to taper the tube as at 36.

In some instances one tool is enough and in Figure 14 the tool 20 is shown formed with a projection 37 surrounded by an annular recessed part to flare the tube 15 at its upper edge. In Figure 15 the tool is provided with a rib 39 to be used on the tube to form a spout 40 and the tube shown is one that has previously been shaped by both inside and outside shaping tools shown in Figure 10.

The use of the outside tool alone is shown in Figures 13 and 16, with the tool 24 in Figure 13 provided with an overhang 41 to close and round the end of the tube 15 and in Figure 16 the tool 24 is shown provided with a marginal rim 42 to depress the end of the tube 15 as at 43. These forms are shown as provided with oil ducts 44 and oil outlets 45.

A modification shown in Figures 5, 6, 7 and 8 provides for rotatable tools which are mounted on a fixture 46 with an adjustable top part for the tool 20 but with the tools rotatable in the bearing 47 and driven by pulley 48 and 49 and the belt 50, the pulley being one driven by power through shaft 51.

The lower or outside shaping tool 24 is driven by the pulleys 52 and 53 and the belt 54, the pulley 52 being driven by shaft 55. This form of machine is used in providing screw-threaded ends or shafts, the tool 24 being provided with a helical ridge 56 and the tool 24 rotated in place or a straight rib 57 may be used in which case the tool 24 is caused to descend at a proper rate of speed to provide a screw thread of the desired pitch on the tube 15 as in Figures 7 and 8. In case the tools are moved vertically they are operated manually but one skilled in the art can install automatic means for such automatic movement in synchrony with the step-by-step movement of the revolving tube holder.

I claim:

1. A machine for shaping the mouths of tubular glass articles comprising a step-by-step rotating platform, including a holder for a glass tube, a fixture adjacent the edge of such platform, said fixture comprising a rotatable shaping tool movable longitudinally relative to said tube and a rotatable shaping tool movable laterally relative to said tube, both tools being disposed to simultaneously engage the upper end of tube to shape the tube when hot and means for removably securing said tools in the fixture.

2. A machine for shaping the mouths of tubular glass articles comprising a step-by-step rotatable platform including a holder for a glass tube, a fixture adjacent the edge of the platform, said fixture comprising a support, a rod slidable in a plane parallel with a tube in the holder, and a rotatable forming tool supported on the rod and adapted to engage the tube and move longitudinally along the tube when the rod is operated to shape the end of the tube.

3. A machine for shaping the mouths of tubular glass articles comprising a step-by-step rotatable platform including a holder for a glass tube, a fixture adjacent the edge of the platform, said fixture comprising a support, a rod slidable in a plane parallel with a tube in the holder and to point inside the tube and a second member on the support provided with a swinging tool holder and including a tool to engage the outside of the tube and move longitudinally along the tube to co-operate with the first tool to shape the end of the glass tube, the tools both being rotatable for contact with the tube.

CHAS. EISLER.